US012565141B2

(12) United States Patent
Hwang et al.

(10) Patent No.: US 12,565,141 B2
(45) Date of Patent: *Mar. 3, 2026

(54) LIGHTING GRILL ASSEMBLY FOR VEHICLE

(71) Applicant: HYUNDAI MOBIS CO., LTD., Seoul (KR)

(72) Inventors: Moon Sub Hwang, Yongin-si (KR); Soon Mo Lee, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 104 days.

This patent is subject to a terminal disclaimer.

(21) Appl. No.: 18/410,088

(22) Filed: Jan. 11, 2024

(65) Prior Publication Data

US 2024/0140301 A1 May 2, 2024

Related U.S. Application Data

(63) Continuation of application No. 18/137,118, filed on Apr. 20, 2023, now Pat. No. 11,904,763, which is a continuation of application No. 17/873,554, filed on Jul. 26, 2022, now Pat. No. 11,667,235.

(30) Foreign Application Priority Data

Nov. 24, 2021 (KR) ........................ 10-2021-0162911

(51) Int. Cl.
*B60Q 1/26* (2006.01)
*B60R 19/52* (2006.01)

(52) U.S. Cl.
CPC ............ *B60Q 1/2661* (2013.01); *B60R 19/52* (2013.01)

(58) Field of Classification Search
CPC ........ B60R 13/005; B60R 19/52; F21S 41/28; F21S 41/285; F21S 41/50; B60Q 1/2661; B60Q 1/28; B50R 2019/505; B50R 2019/525; B50R 2019/527
See application file for complete search history.

(56) References Cited

U.S. PATENT DOCUMENTS

| | | | |
|---|---|---|---|
| 11,667,235 B1 | 6/2023 | Hwang et al. | |
| 2018/0194277 A1 * | 7/2018 | Lobo ...................... | B60R 13/005 |
| 2021/0364145 A1 * | 11/2021 | Lee .......................... | F21S 43/31 |
| 2021/0387570 A1 * | 12/2021 | Piles Guillem ........... | B44C 5/04 |

OTHER PUBLICATIONS

U.S. Appl. No. 18/137,118, filed Apr. 20, 2023, Moon Sub Hwang et al., Hyundaie Mobis Co., Ltd.

* cited by examiner

*Primary Examiner* — Abdulmajeed Aziz
*Assistant Examiner* — Steven Y Horikoshi
(74) *Attorney, Agent, or Firm* — NSIP Law

(57) ABSTRACT

Disclosed are a lighting grill assembly for a vehicle and a method of manufacturing the same, the lighting grill assembly for a vehicle a grill cover, a black paint portion painted using a black paint on a rear surface of the grill cover, and the black paint portion forming a light transmitting portion through which light passes by removing a part of the painted black paint, an inner lens spaced apart from the rear surface of the grill cover in a rearward direction, and a metal layer is deposited on a surface of the inner lens, and a light source configured to radiate light from a rear of the inner lens.

6 Claims, 7 Drawing Sheets

FIG. 7

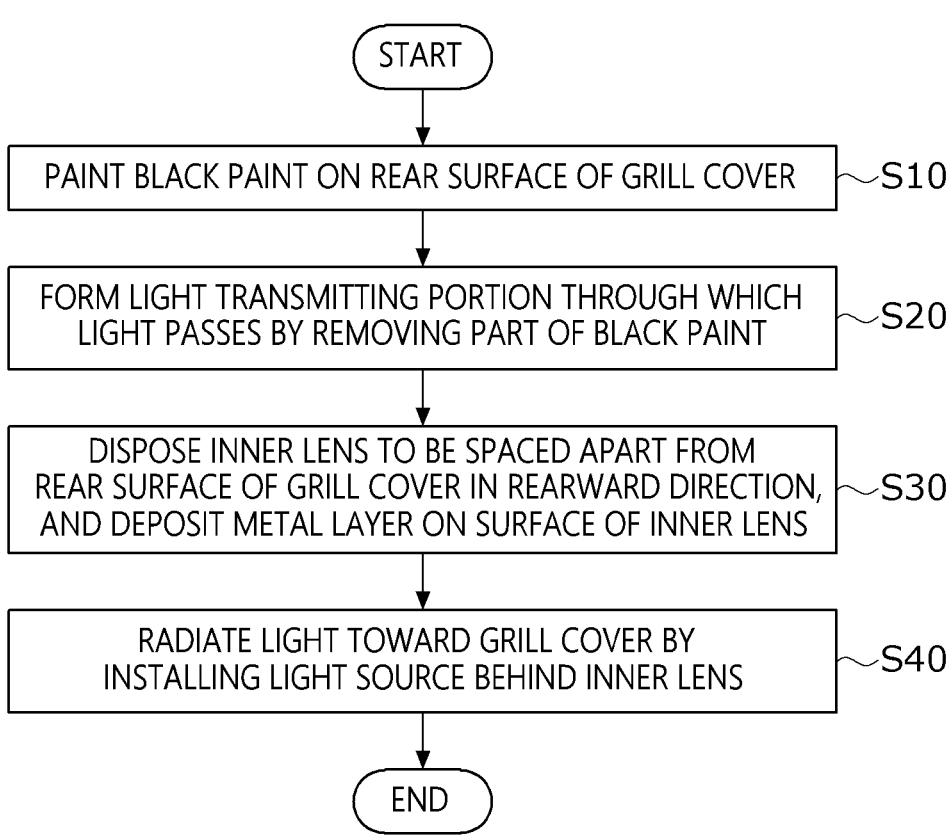

START

PAINT BLACK PAINT ON REAR SURFACE OF GRILL COVER     ~S10

FORM LIGHT TRANSMITTING PORTION THROUGH WHICH
LIGHT PASSES BY REMOVING PART OF BLACK PAINT     ~S20

DISPOSE INNER LENS TO BE SPACED APART FROM
REAR SURFACE OF GRILL COVER IN REARWARD DIRECTION,
AND DEPOSIT METAL LAYER ON SURFACE OF INNER LENS     ~S30

RADIATE LIGHT TOWARD GRILL COVER BY
INSTALLING LIGHT SOURCE BEHIND INNER LENS     ~S40

END

LIGHTING GRILL ASSEMBLY FOR VEHICLE

CROSS-REFERENCE TO RELATED APPLICATION

This application is a Continuation Application of U.S. application Ser. No. 18/137,118 filed on Apr. 20, 2023, which is a Continuation Application of, and claims the benefit of, U.S. application Ser. No. 17/873,554 filed on Jul. 26, 2022, now U.S. Pat. No. 11,667,235, which claims the benefit under 35 USC § 119(a) of Korean Patent Application No. 10-2021-0162911, filed in the Korean Intellectual Property Office on Nov. 24, 2021, the entire disclosure of which is incorporated herein by reference for all purposes

BACKGROUND

1. Field

Disclosed are a lighting grill assembly for a vehicle and a method of manufacturing the same, and more specifically, to a lighting grill assembly for a vehicle, which is mounted on a front surface of a vehicle to emit light to the outside, and a method of manufacturing the same.

2. Description of Related Art

In conventional internal combustion engine vehicles, a grill mounted on a front surface of a vehicle serves to cool an engine and a radiator by introducing air into an engine room. In electrified vehicles such as electric vehicles, fuel cell vehicles, and the like that have been developed recently, there is a problem that the efficiency of the grill decreases because there is no need to separately install a cooling device in the engine room.

As described above, as the direction of the development is changed from internal combustion engine vehicles to electrified vehicles, a new type of grill is being developed in which modeling elements, emblems, light emitting diodes (LEDs), and the like are disposed on the front of a vehicle to serve a function other than that of the conventional grill. In other words, as a lighting grill with an LED lighting function applied to the grill mounted on the front surface of the vehicle is developed, a design aspect other than a cooling function of the conventional grill is emphasized, and the lighting grill is also developed as a means for displaying various functions such as an autonomous traveling mode, an electric vehicle charging mode, a welcome light function, and a sound beat display.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a lighting grill assembly for a vehicle, the lighting grill assembly including a grill cover, a black paint portion painted using a black paint on a rear surface of the grill cover, and the black paint portion forming a light transmitting portion through which light passes by removing a part of the painted black paint, an inner lens spaced apart from the rear surface of the grill cover in a rearward direction, and a metal layer is deposited on a surface of the inner lens, and a light source configured to radiate light from a rear of the inner lens.

The lighting grill assembly may include a clear paint portion painted using a clear paint on the rear surface of the grill cover on which the black paint portion is formed.

The lighting grill assembly may include a diffusion paint portion is painted, using a diffusion paint, on a rear surface of the inner lens.

A fine pattern portion may be formed on the metal layer, the fine pattern portion corresponding to a rear of the light transmitting portion.

The light transmitting portion and the fine pattern portion may be formed by removing the painted black paint and the deposited metal layer by laser etching.

The lighting grill assembly may include a grill housing coupled to the rear surface of the grill cover, and a plurality of light sources being installed in the grill housing, and a light source installation groove extending in a rearward direction may be formed in the grill housing, and each of the of the plurality of light sources are installed in the light source installation groove.

In another general aspect, there is provided a method of manufacturing a lighting grill assembly for a vehicle, the method including painting a black paint on a rear surface of a grill cover, forming a light transmitting portion through which light passes by removing a part of the black paint, disposing an inner lens to be spaced apart from the rear surface of the grill cover in a rearward direction, depositing a metal layer on a surface of the inner lens, and radiating light toward the grill cover by installing a light source behind the inner lens.

The method may include painting a clear paint on the rear surface of the grill cover on which the black paint is painted.

The method may include painting a diffusion paint on a rear surface of the inner lens.

The method may include forming a fine pattern portion on the metal layer corresponding to a rear of the light transmitting portion.

Other features and aspects will be apparent from the following detailed description, the drawings, and the claims.

BRIEF DESCRIPTION OF THE DRAWINGS

FIG. 7 is a flowchart showing a method of manufacturing the lighting grill assembly for a vehicle according to one embodiment of the present invention.

Figure 1:
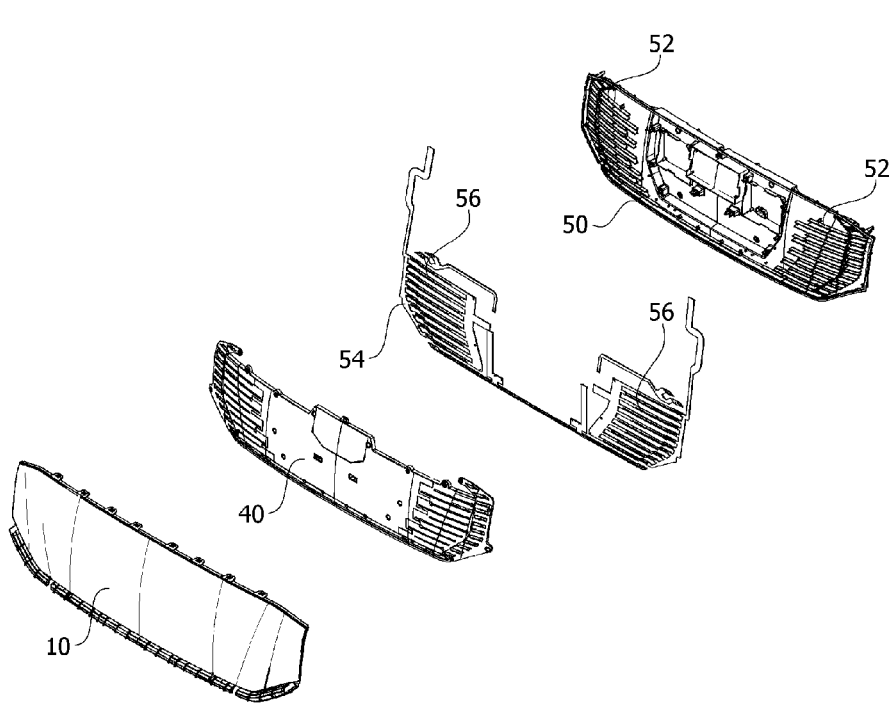
FIG. 1 is an exploded perspective view showing a lighting grill assembly for a vehicle according to one embodiment of the present invention.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween.

The terminology used herein is for describing various examples only and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Although terms such as "first," "second," and "third," A, B, C, (a), (b), (c), or the like may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in the examples described herein may also be referred to as a second member, component, region, layer, or section without departing from the teachings of the examples.

Hereinafter, a lighting grill assembly for a vehicle according to one embodiment of the present invention will be described in detail with reference to the accompanying drawings, and in describing one embodiment with reference to the accompanying drawings, the same or corresponding components are denoted by the same reference numbers and overlapping descriptions thereof will be omitted.

Figure 2:
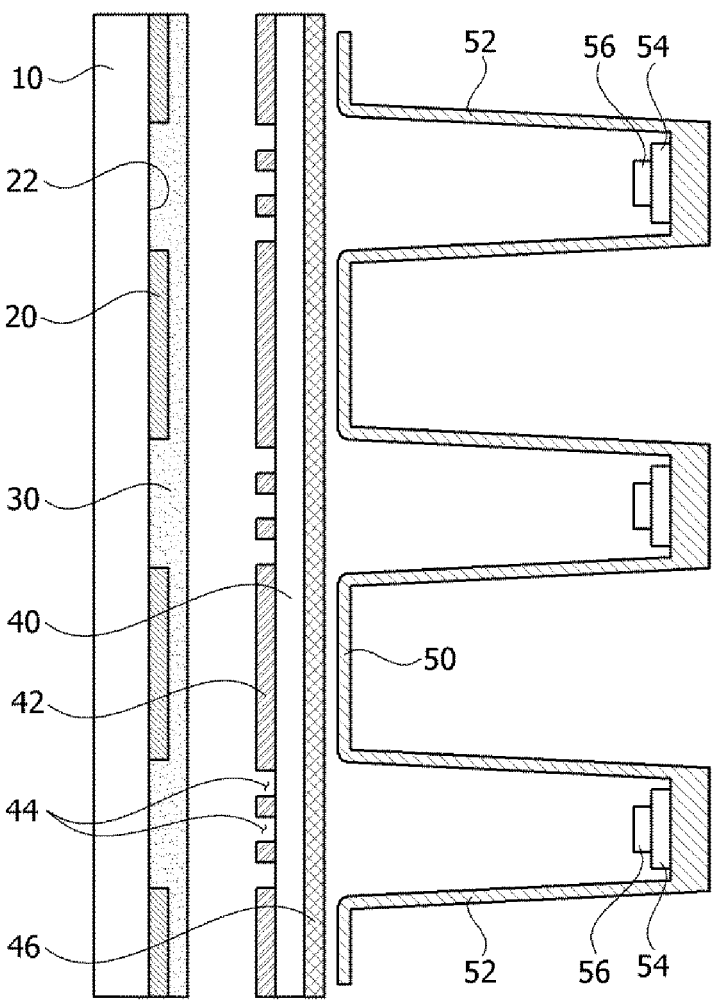
FIG. 2 is a side view showing the lighting grill assembly for a vehicle according to one embodiment of the present invention.

FIG. 1 is an exploded perspective view showing a lighting grill assembly for a vehicle according to one embodiment of the present invention, and FIG. 2 is a side view showing the lighting grill assembly for a vehicle according to one embodiment of the present invention.

Accordingly, as shown in the drawings, the lighting grill assembly for a vehicle according to one embodiment of the present invention includes a grill cover 10, a black paint portion 20, an inner lens 40, a grill housing 50, and a light source 56.

The grill cover 10 forms a front exterior of the lighting grill assembly, and may be made of, for example, a transparent material such as polycarbonate (PC). The grill cover 10 has a plate shape that is elongated approximately in a left-right direction to occupy a significant portion of the front surface of a vehicle.

The black paint portion 20 is painted on a rear surface of the grill cover 10 with a black paint. The black paint portion 20 is a portion formed for masking and is a portion in which light radiated from the light source 56 is not transmitted and is shielded.

The black paint portion 20 is painted over the entire rear surface of the grill cover 10, and in this embodiment, a part of the black paint portion 20 is removed to form a light transmitting portion 22 through which light passes. The light transmitting portion 22 is a portion through which the light passing through a fine pattern portion 44 to be described below passes, and is a portion from which a lighting design pattern formed by the fine pattern portion 44 is substantially emitted to the outside. To this end, the light transmitting portion 22 may be formed, for example, in various shapes such as a rectangle, a circle, and the like having a predetermined area. A plurality of light transmitting portions 22 may be formed in a plurality of columns and rows with respect to the grill cover 10, and the plurality of light transmitting portions 22 may also be irregularly formed according to a design pattern.

Meanwhile, the black paint portion 20 painted to form the light transmitting portion 22 may be removed, for example, by laser etching, but the present invention is not limited thereto, and various methods of removing the black paint portion 20 may be used.

A clear paint portion 30 on which a clear paint is painted is formed on the rear surface of the grill cover 10 on which the black paint portion 20 is formed. When the black paint portion 20 is removed by the laser etching after the black paint portion 20 is painted, a removed surface of the grill cover 10 may be formed to be opaque, and scratches may occur on the surface. Accordingly, in this embodiment, by forming the clear paint portion 30 on the rear surface of the grill cover 10 and the surface of the black paint portion 20, it is possible to protect an object to be painted and an internal coating film from external environments. In addition, the clear paint portion 30 is formed with a constant paint film thickness when painted, and secures gloss and hardness, so that it is possible to improve the color (transparency) quality of the product.

Next, the inner lens 40 is disposed to be spaced apart from the rear of the grill cover 10 in a rearward direction. The inner lens 40 is formed in a shape corresponding to the rear surface of the grill cover 10, and a metal layer 42 is deposited on the surface thereof. Various metals such as aluminum and the like may be deposited on the metal layer 42. In this embodiment, when the metal layer 42 is deposited on the surface of the inner lens 40, the light radiated from the light source 56 may be emitted to the outside through the metal layer 42, thereby increasing the lighting effect.

In addition, as described above, the inner lens 40 is disposed to be spaced apart from the rear surface of the grill cover 10 in a rearward direction, and the metal layer 42 is not directly deposited on the rear surface of the grill cover 10, so that it is possible to improve the quality of the product. More specifically, for example, when the metal layer 42 is directly deposited on the black paint portion 20, a defect may occur at a boundary with the black paint portion 20 after the metal layer 42 is partially removed. However, according to this embodiment, the black paint portion 20 and the metal layer 42 are separated from each other to perform the operation, thereby fundamentally preventing the occurrence of a problem due to their overlapping (chemical reaction between the paints).

A part of the metal layer 42 is removed by the laser etching as in the above-described light transmitting portion 22 to form the fine pattern portion 44. The fine pattern portion 44 is a portion in which the lighting design emitted to the outside is substantially formed, and various design patterns capable of revealing the brand and identity of a vehicle may be applied.

As described above, since the metal layer 42 is deposited on the inner lens 40 and then the fine pattern portion 44 is formed, it is possible to improve a luminance value of the light source 56, thereby improving the performance and quality of the product.

A diffusion paint portion 46 to which a diffusion paint material is painted is formed on a rear surface of the inner lens 40. For example, when a light emitting diode (LED) itself used as the light source 56 is seen as a hot spot, the quality of the product is degraded, and thus the diffusion paint portion 46 serves to diffuse light radiated from the LED so as not to look like a hot spot. In other words, the light passing through the diffusion paint portion 46 is diffused, thereby making the light appear to spread gently from the outside as a whole.

A silicone-based resin having excellent molecular lubricity and properties as a light diffusion medium may be used as a base resin of the diffusion paint. In addition, a solvent included in the diffusion paint may be enamel thinner, urethane thinner, lacquer thinner, etc. An inorganic pigment of a color material included in the diffusion paint may be made of any one or more of bengala, vermilion, cadmium red, chrome yellow, ocher, cadmium yellow, prussian blue, and cobalt blue depending on the color. When such an inorganic pigment is included, it is possible to obtain a paint having a desired light diffusion performance even with a long lifespan.

Next, the grill housing 50 may be disposed behind the inner lens 40, and the grill housing 50 may be coupled to the rear surface of the grill cover 10. The grill housing 50 is a portion provided for the installation of a substrate 54 and the light source 56, and the grill housing 50 is also formed in a shape corresponding to the shape of the grill cover 10 and has a plate shape that is approximately elongated in a left-right direction.

In this embodiment, a light source installation groove 52 is formed in the grill housing 50 to be recessed in a rearward direction. The light source installation groove 52 is formed by bending the rear surface of the grill housing 50 in a rearward direction and extends to have a predetermined depth in the rearward direction.

Each of the substrate 54 and the light source 56 may be installed in the light source installation groove 52, and a plurality of light source installation grooves 52 may be arranged in columns and rows in the grill housing 50. As described above, since the light source installation groove 52 extends to have the predetermined depth, and the substrate 54 and the light source 56 are installed on the innermost inner surface of the light source installation groove 52, a certain distance is secured between the light source 56 and the inner lens 40. When the distance between the light source 56 and the inner lens 40 is too close, the light radiated to the outside may look like a hot spot without spreading to a predetermined area, so that in order to prevent the above, in this embodiment, the light source 56 is installed on the inner surface of the light source installation groove 52.

In addition, since the light source installation grooves 52 are provided independently of each other without interfering with each other, the light radiated from the light sources 56 installed in each of the light source installation grooves 52 does not interfere with each other. For example, there is a problem that when wavelengths of light radiated from each light source 56 are different, the lights overlap each other when the lights are radiated in a state in which the light source 56 is not installed in the light source installation groove 52, and in this embodiment, the light source installation grooves 52 are provided independently of each other so that the lights do not overlap each other.

Hereinafter, a method of manufacturing the lighting grill assembly for a vehicle according to one embodiment of the present invention will be described with reference to FIGS. 3 to 7. FIGS. 3 to 6 are views sequentially showing manufacturing of a lighting grill assembly for a vehicle according to one embodiment of the present invention, and FIG. 7 is a flowchart showing a method of manufacturing the lighting grill assembly for a vehicle according to one embodiment of the present invention.

Figure 3:
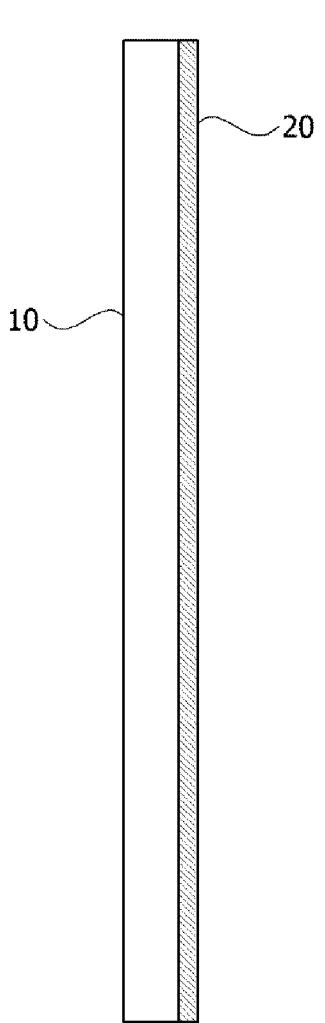
FIGS. 3 to 6 are views sequentially showing manufacturing of the lighting grill assembly for a vehicle according to one embodiment of the present invention.

Referring to FIG. 3, a black paint is painted on a rear surface of a grill cover 10 (S10). The black paint is painted to mask the rear surface of the grill cover 10, and shields the light radiated from a light source 56 to prevent transmission.

Figure 4:
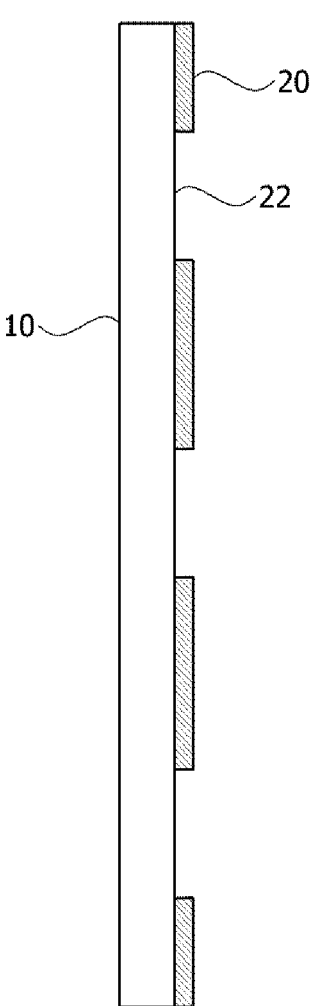

Referring to FIG. 4, some of the painted black paint is removed to form a light transmitting portion 22 through which light passes (S20). Here, the painted black paint may be removed by a method such as laser etching, and the light transmitting portion 22 is a portion through which the light passing through a fine pattern portion 44 passes to be emitted to the outside.

Figure 5:
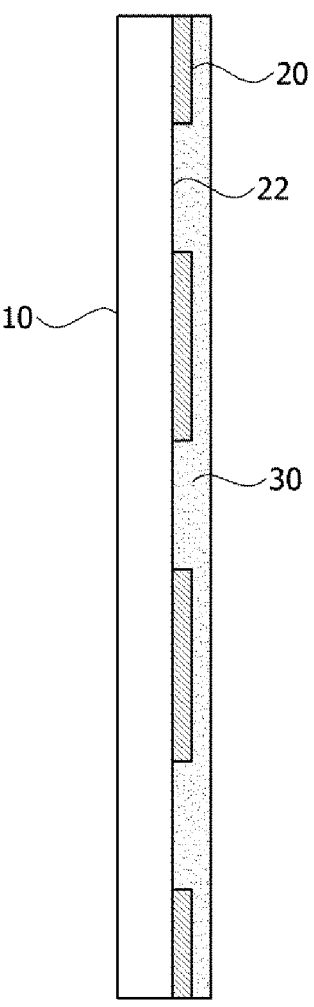

Referring to FIG. 5, a clear paint is painted on the rear surface of the grill cover 10 on which the black paint is painted to form a clear paint portion 30. The clear paint portion 30 protects an object to be painted and an internal paint film from the external environments, is formed with a constant paint film thickness when painted, and secures gloss and hardness, thereby improving the color (transparency) quality of the product.

Figure 6:
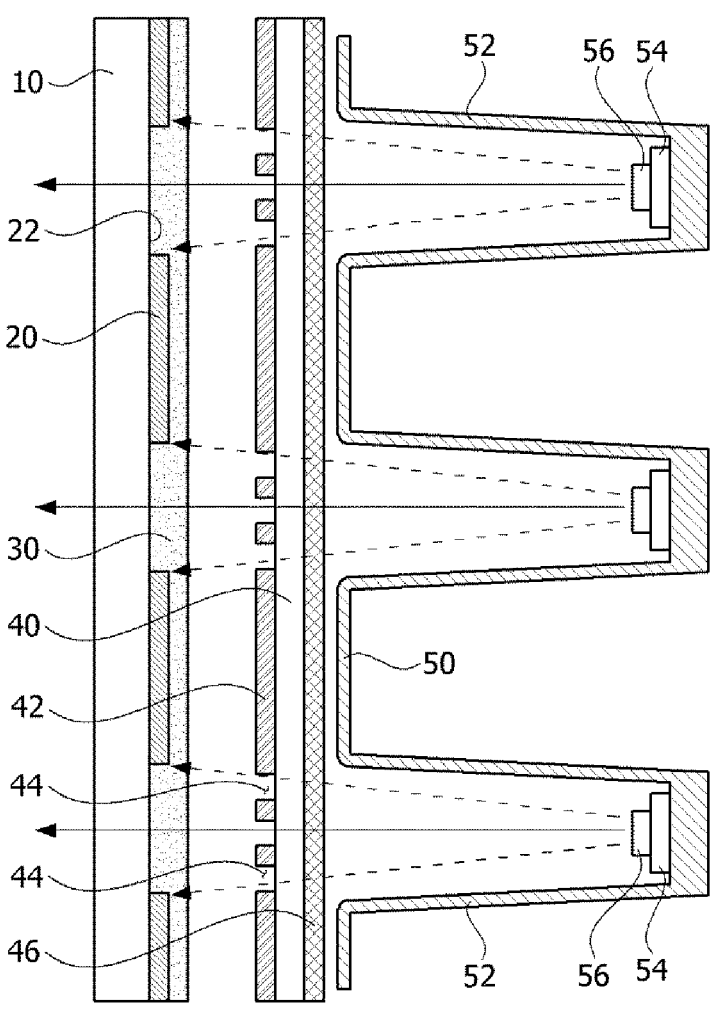

Referring to FIG. 6, an inner lens 40 is disposed to be spaced apart from the rear surface of the grill cover in a rearward direction, and a metal layer 42 is deposited on the surface of the inner lens 40 (S30). As described above, when the metal layer 42 is deposited on the inner lens 40 and then the fine pattern portion 44 is formed, it is possible to improve a luminance value of the light source 56, thereby improving the performance and quality of the product.

Next, the light source 56 is installed behind the inner lens 40 to radiate light toward the grill cover 10 (S40). The light radiated from the light source 56 is emitted to the outside through the fine pattern portion 44 and the light transmitting portion 22, and at this point, the light may pass through the fine pattern portion 44 on which the metal layer 42 is deposited, thereby improving the luminance value and creating various lighting designs.

According to an embodiment, it is possible to display design patterns to which various shapes and sizes are applied to a rear surface of a grill cover through a light source, thereby making the design of a vehicle more beautiful.

In addition, an embodiment makes it possible to have a metal layer disposed to be spaced apart from a rear surface of a grill cover to emit light through the metal layer, thereby differentiating the exterior design of a vehicle.

In addition, an embodiment is directed to providing a lighting grill assembly for a vehicle, which displays design patterns to which various shapes and sizes are applied to a rear surface of a grill cover through a light source, thereby making the design of a vehicle more beautiful, and a method of manufacturing the same.

In addition, an embodiment is directed to providing a lighting grill assembly for a vehicle, which has a metal layer disposed to be spaced apart from a rear surface of a grill cover to emit light through the metal layer, thereby differentiating an exterior design of a vehicle, and a method of manufacturing the same.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A lighting grill assembly for a vehicle, the lighting grill assembly comprising:

a grill cover forming a light transmitting portion through which light passes;

an inner lens spaced apart from one surface of the grill cover, and having a metal layer deposited thereon; and a light source configured to radiate light toward the inner lens, wherein a fine pattern portion is formed on the metal layer, the fine pattern portion corresponding to the light transmitting portion.

2. The lighting grill assembly of claim 1, further comprising:

a black paint portion painted using a black paint on at least a portion of the one surface of the grill cover, forming another light transmitting portion through which light passes.

3. The lighting grill assembly of claim 2, further comprising:

a clear paint portion painted using a clear paint on the rear surface of the grill cover on which the black paint portion is formed.

4. The lighting grill assembly of claim 1, further comprising:

a diffusion paint portion is painted, using a diffusion paint, on a rear surface of the inner lens.

5. The lighting grill assembly of claim 2, wherein the light transmitting portion and the fine pattern portion are formed by removing the painted black paint and the deposited metal layer by laser etching.

6. The lighting grill assembly of claim 1, further comprising:

a grill housing coupled to the rear surface of the grill cover, and a plurality of light sources being installed in the grill housing; and a light source installation groove extending in a rearward direction is formed in the grill housing, and each of the of the plurality of light sources are installed in the light source installation groove.

* * * * *